(12) United States Patent
Boebel et al.

(10) Patent No.: US 7,614,925 B2
(45) Date of Patent: Nov. 10, 2009

(54) TRANSPORTABLE OUTBOARD MOTOR

(75) Inventors: Friedrich Boebel, Eurasburg (DE); Klaus Kraft, Blaustein (DE); Heinrich Walk, Allmendingen (DE)

(73) Assignee: Torqeedo GmbH, Starnberg (DE)

( * ) Notice: Subject to any disclaimer, the term of this patent is extended or adjusted under 35 U.S.C. 154(b) by 0 days.

(21) Appl. No.: 11/511,317

(22) Filed: Aug. 29, 2006

(65) Prior Publication Data
US 2007/0049138 A1 Mar. 1, 2007

(30) Foreign Application Priority Data
Aug. 30, 2005 (EP) .................... 05018833

(51) Int. Cl.
| | |
|---|---|
| B60L 11/00 | (2006.01) |
| B63H 21/17 | (2006.01) |
| B63H 1/14 | (2006.01) |
| B63H 5/20 | (2006.01) |
| B63H 5/125 | (2006.01) |
| B63H 20/08 | (2006.01) |

(52) U.S. Cl. .................. 440/6; 440/49; 440/53
(58) Field of Classification Search ............. 440/6, 440/7, 53, 49
See application file for complete search history.

(56) References Cited

U.S. PATENT DOCUMENTS

| | | | | |
|---|---|---|---|---|
| 1,790,856 | A | | 2/1931 | Evinrude |
| 3,315,631 | A | * | 4/1967 | Bass ............ 440/6 |
| 3,498,253 | A | * | 3/1970 | Wood, Jr. ....... 440/6 |
| 3,624,738 | A | | 11/1971 | Gill |
| 3,669,133 | A | * | 6/1972 | Hyman .......... 135/74 |
| 3,730,544 | A | * | 5/1973 | Hyman .......... 280/819 |
| 4,167,354 | A | * | 9/1979 | Walker .......... 403/109.7 |
| 4,362,512 | A | | 12/1982 | Johnson |
| 4,838,817 | A | | 6/1989 | Travis |
| 5,816,870 | A | | 10/1998 | Rubin |
| 6,213,821 | B1 | | 4/2001 | Bernloehr et al. |

(Continued)

FOREIGN PATENT DOCUMENTS

DE      299 20 390 U1    4/2000

(Continued)

OTHER PUBLICATIONS

Heinemann, *Elektrlscher Motorpropeller—Stand der Entwicklung und Anwendung* (Electric-Motorpropeller—State of Development and Application), Jahrbuch Der Schiffbautechnischen Gesellschaft, Bd. 86, 1992, pp. 88-94 (with English Summary).

(Continued)

*Primary Examiner*—Lars A Olson
*Assistant Examiner*—Daniel V Venne
(74) *Attorney, Agent, or Firm*—Crowell & Moring LLP

(57) ABSTRACT

A transportable outboard drive for a boat has a head, a pylon, a shaft connecting the head and the pylon, an electric motor and a cable running inside the shaft. The shaft has at least two shaft sections and wherein the head, shaft and pylon can be arranged in a working configuration or in a transport configuration. In the working configuration, the head, the shaft and the pylon are rigidly connected to each other. In the working configuration and the transport configuration, the cable and shaft are differently positioned with respect to each other, whereas, in its transport configuration, the shaft sections are separated from each other.

8 Claims, 3 Drawing Sheets

U.S. PATENT DOCUMENTS 6,664,692 B1    12/2003    Kristoffersen
6,802,749 B1    10/2004    Justus
7,163,427 B1 *    1/2007    Lee ............................... 440/6

FOREIGN PATENT DOCUMENTS

| | | |
|---|---|---|
| DE | 201 21 672 U1 | 3/2003 |
| EP | 0 867 361 A2 | 9/1998 |
| EP | 1 215 115 A2 | 6/2002 |
| JP | 9-20291 A | 1/1997 |

OTHER PUBLICATIONS

Pellegrino, et. al., *Design of Direct-Drive, Low-Speed PM Machines.*, IEEE Industry Applications Conf. 2003, Online, Bd. 2, 12, Oct. 2003, pp. 1421-1428.

Kaufhold, et. al., *Permanenterregte Grossmaschinen: Potenziale in der Oberklasse (Permanet Magnet Field Excited Large-Scale Machines: Potentials in the Top Class)*, ETZ—Elektrotechnik & Automation, VDI Verlag, Online, Bd. 123, Nr. 20, 2002, pp. 2-7 (with English Abstract).

Chan, et. al., *A Novel High Power Density Permanent Magnet Variable-Speed Motor*, IEEE Transactions on Energy Conversion, IEEE Power Engineering Society, Online, Bd. 8, Nr. 2, Jun. 1993, pp. 297-303.

Magens, *Permasyn—Ein permanenterregter Synchronmotor fuer den Schiffsbetrieb (Permasyn—a permanent-field, converter-fed motor for propulsion systems)*, Jahrbuch Der Schiffbautechnischen Gesellschaft, Bd. 81, 1988, pp. 221-227 (with English Summary).

*Permasyn Motors for Submarine Propulsion*, Siemens—Industrial Solutions and Services, Online, 2001, pp. 1-14.

European Search Report dated Feb. 9, 2006 including English translation of relevant portion (Seven (7) pages).

* cited by examiner

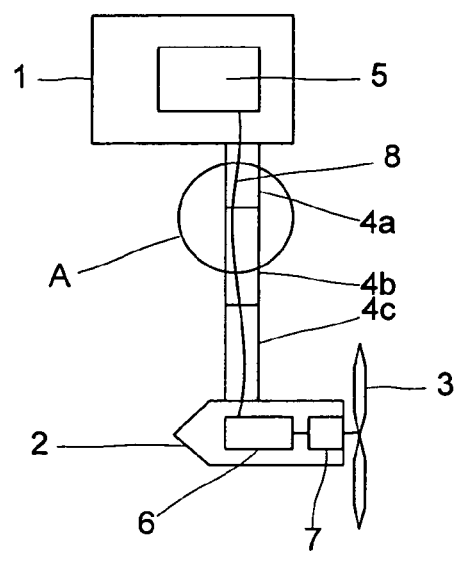
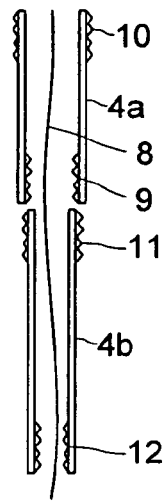
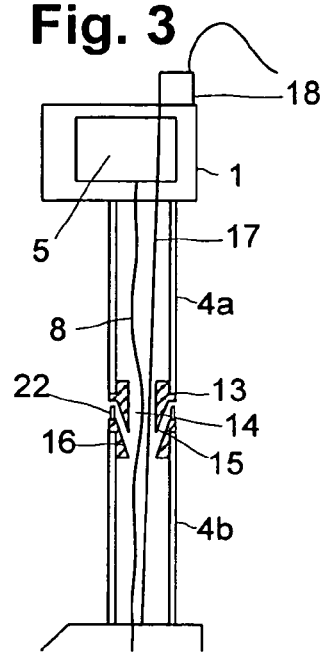
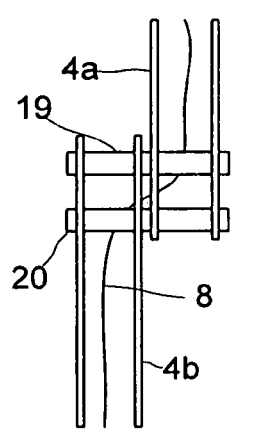
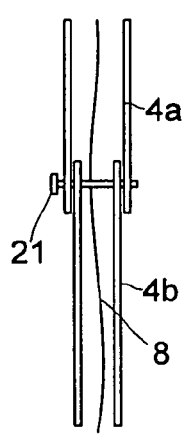
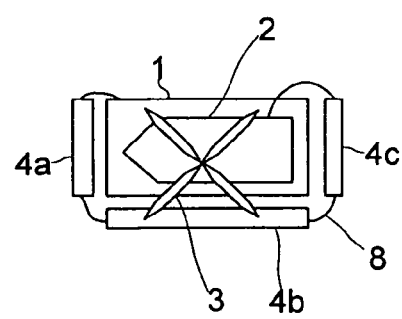

TRANSPORTABLE OUTBOARD MOTOR

This application claims the priority of EP 05 018 833.3, filed Aug. 30, 2005, the disclosure of which is expressly incorporated by reference herein.

BACKGROUND AND SUMMARY OF THE INVENTION

The present invention relates to a transportable outboard drive for a boat comprising a head, a pylon, a shaft connecting the head and the pylon, an electric motor and a cable running inside said shaft. The shaft comprises at least two shaft sections, and the head, the shaft and the pylon can be arranged in a working configuration or in a transport configuration. In the working configuration, the head, the shaft and the pylon are rigidly connected to each other, and in the working configuration and in the transport configuration, the cable and the shaft are differently positioned with respect to each other.

Outboard boat motors with combustion engines normally comprise an upper part or a head for housing the motor, an under-water housing or pylon comprising a propeller and a shaft connecting the head with the pylon. A drive shaft is used to transmit the motor power to the propeller.

Electric outboard motors are often construed such that the electrically powered motor which drives the propeller is placed within the pylon. The head or upper part of the outboard drive sometimes includes housing or a cover for a battery, sometimes it is only provided with steering device to rotate the outboard drive. In the later case, the batteries are located inside the boat. The shaft includes control wires and/or power cables extending from the upper part to the pylon.

Small boats with an outboard drive are often carried in automobiles or otherwise to the place where they are used. Due to the relative long design of the shaft, it is very inconvenient and unhandy to transport such outboard drives. Thus, an outboard drive which has a more space-saving and compact format for transport would be desirable.

U.S. Pat. No. 1,790,856 discloses a foldable outboard combustion motor comprising a shaft with a hinge in order to fold up the lower part of the shaft and the pylon for transport. For this purpose, the drive shaft housing and the drive shaft are each made up of two sections detachably connected together so that the lower section of the housing and the drive shaft section contained therein may be easily folded up to the upper housing section.

The folding mechanism disclosed in U.S. Pat. No. 1,790,856 is not easily transferable to electric powered outboard drives. Electric boat motors are often supplied with high currents up to 150 A which require electric cables with a cross section as high as of for example 15 mm². But such thick cables have a relative large bending radius, so that it is difficult or nearly impossible to fold the shaft as described in U.S. Pat. No. 1,790,856. This is especially true when the diameter of the shaft exceeds the diameter of the cable only little.

U.S. Pat. No. 6,213,821 B1 discloses an outboard drive with an elongate tubular housing telescopically receiving the motor tube. An electric control wire extends through the shaft from a control circuit in the upper part or head of the outboard drive to the propulsion unit in the pylon. Inside the shaft the wire is arranged in a loop by a wire management mechanism. When the length of the shaft is changed by sliding the motor tube along the tubular housing, the size of the cable loop automatically increases or decreases and prevents that the wire is being pulled out of the circuit board.

For high current applications which require cables with a large cross section, such a wire or cable management mechanism is not applicable since it is not possible to bend thick cables in such small loops.

An object of the present invention is to provide an outboard drive that can be easily transported.

This object is achieved by a transportable outboard drive for a boat comprising a head, a pylon, a shaft connecting the head and the pylon, an electric motor and a cable running inside the shaft which comprises at least two shaft sections. The head, the shaft and the pylon can be arranged in a working configuration or in a transport configuration. In the working configuration, the head, the shaft and the pylon are rigidly connected to each other, and in the working configuration and in the transport configuration the cable and the shaft are differently positioned with respect to each other and on which transport configuration the shaft sections are separated from each other.

The term "electric cable" or "cable" as used herein means any device or apparatus for conducting electric current, in particular cables or wires. The invention especially relates to outboard drives using electric cables with a cross section of at least 10 mm², preferably at least 20 mm², more preferred at least 25 mm².

The term "head" as used herein means the upper part of the outboard drive which is coupled to the uppermost end of the shaft and which preferably houses a battery.

The term "pylon" as used herein means the under-water part of the outboard drive which is coupled to the lower end of the shaft and which includes the electric propulsion unit or motor.

The inventive outboard drive comprises a head, a pylon and a shaft. The shaft comprises shaft sections which are preferably hollow. The cable extends within or along the shaft sections from the head to the electric motor in the pylon. The single parts of the outboard drive can be arranged in a working configuration or in a transport configuration.

In the working configuration the head, the shaft and the pylon are rigidly fixed together in order to transmit the power from the propeller which is submerged in the water to the boat.

When the outboard drive is assembled according to the transport configuration, at least a part of the cable is movable relative to the shaft. Thus, the position of at least a part or section of the cable with respect to the shaft is different when arranging the parts of the outboard drive in the working configuration rather than in the transport configuration. For example, in the transport configuration, one section of the cable can be positioned such that this section of the cable does not extend along the shaft.

The outboard drive can be packed to a small volume whereby that section of the cable which is movable with respect to the shaft can be rolled up or otherwise be minimized. Contrary to the mechanism described in the above-mentioned U.S. Pat. No. 1,790,856, the volume of the shaft and the cable running within or along the shaft can be made smaller independently from each other.

According to the present invention, the shaft sections are separated from each other in the transport configuration. The cable extends inside the shaft sections, but the shaft sections themselves are separate and movable relative to each other. In this way, a larger bending radius of the cable can be achieved rather than in an arrangement where the shaft sections are connected. When using a folding mechanism as disclosed in U.S. Pat. No. 1,790,856, the bending radius for the cable is directly related to the cross-section of the shaft. The smaller the shaft, the more the cable has to be bent when the shaft is folded. According to the invention, the shaft sections are separated from each other so that the bending radius of the cable is not limited by the dimensions of the shaft sections.

Preferably, the cable remains fixed to the head as well as to the motor or any other part in the pylon when the outboard drive is changed from the working configuration to the transport configuration.

In the transport configuration, at least one shaft section is preferably movable with respect to the cable along its longitudinal axis. The cable placed inside the shaft section can then be freely moved along the cable.

A particular compact design of the outboard drive is achieved if all shaft sections are freely movable relative to the cable. In that case, the shaft sections can, for example, be equally distributed along the length of the cable. All shaft sections can be positioned at one end of the cable. The decision on how to arrange the shaft sections in the transport configuration depends on the configuration of the shaft sections and of the cable, especially the length and flexibility of the cable.

It is also advantageous to slide one shaft section into another one in the working configuration. According to a preferred embodiment, the shaft sections comprise connectors which are configured to fit to each other with positive locking. In that respect, connection assemblies, in particular plug-and-socket connections, of any kind can be used. For example, the connectors can be provided with a kind of plug and receptacle at their front ends so that the shaft sections can be put together in their longitudinal direction. Various other male and female structures may be used to fix one shaft section to another. Securing or locking apparatus, such as a securing bolt or a securing screw, guarantee that the shaft sections remain rigidly fixed together in the working configuration.

Preferably the shaft sections can be provided with dovetails at their front ends. In that case, the shaft sections are connected to each other by moving one shaft section relative to another shaft section transverse to their longitudinal axis. Preferably, the shaft sections are fixed to each other by a kind of bayonet nut connector.

According to another preferred embodiment of the invention, the shaft sections are plugged together in the working configuration. It is further preferred to use a pulling tool which pulls the shaft sections together and fixes them in their position. Preferably, the shaft sections are provided with insets, whereby one inset is connected to the inset of another shaft section. Preferably, one of the insets comprises or is formed as a cone and the inset of the other shaft section the respective counterpart. Further, the shaft sections may be provided with guide bolts and respective counterparts.

The shaft sections are preferably held together by pulling apparatus, especially by a pull rope, and in particular a steel rope. Thereby, the shaft sections are pressed together in the direction of their longitudinal axis. The pull rope can be fastened to the pylon and extend from the pylon through the shaft to the head. The head is preferably provided with apparatus for fixing the pull rope, for example, with a clamping mechanism, a screw or a turning knob. In order to rigidly connect the shaft sections, the pull rope is tightened and fixed so that the shaft sections are pressed to each other.

Instead of using the above mentioned insets which are preferably made of plastics, in particular made by injection molding, the ends of the shaft sections can be configured in such a way that two shaft sections can be plugged together.

It is also advantageous to provide the ends of the shaft sections with threads and to screw the shaft sections together. It is also preferable to provide one shaft end with a boring socket or drill chuck as it is well-known from commercially available drilling machines, and to clamp the end of the other shaft section into the drill chuck.

The present invention is preferably used with an electric powered outboard drive which comprises a hollow shaft and an electric cable extending from the head of the drive to the pylon. The shaft sections can be separated from each other for transport of the outboard drive. After separating the shaft sections from each other, the shaft sections are freely movable along the cable. The electric cable can, for example, be rolled up whereby those parts of the cable which are inside a shaft section extend, more or less, linearly and those parts of the cable which are outside the shaft sections can be bent. The bending radius is chosen such that the cable is not damaged.

The above-mentioned options to connect the shaft sections to each other can also be used to connect the head to the uppermost shaft section or to connect the pylon to its adjacent shaft section. Preferably, the connections between the head of the outboard drive or between the pylon and the adjacent shaft sections are configured to be removable or to be loosened so that for transport reasons the shaft can be separated from the head and also from the pylon.

Preferably, in the transport configuration, after opening the connections between the head, the shaft sections and the pylon, the head, the shaft sections and the pylon are still indirectly connected by the cable. The shaft sections are freely movable along the cable. For example, the head and the pylon can be put one upon the other and the cable is rolled around them. Thereby, the inventive outboard drive can be reduced to a compact and space-saving packing size.

It is also preferable to connect the cable to the head and/or to the pylon, respectively the electric motor in the pylon, by plug-and-socket connections. In that case, the head, the pylon with the motor, the shaft sections and the cable can be totally separated from each other. Thereby, in the transport configuration the size of the outboard drive can be reduced even further.

The plug connectors should, however, always guarantee good electric contact. Therefore, the plug connectors should be protected from dust and dirt. When using the above-mentioned configuration where the cable is always fixed to the head and to the pylon, there is no risk that the electric conductance is disrupted.

Preferably, the shaft comprises at least three shaft sections, more preferably no more than five shaft sections. With respect to the number of shaft sections, consideration should be given to the fact that by using an increasing number of shaft sections the transport size might be reduced. But in the working configuration, the stability of the shaft is also reduced by increasing the number of shaft sections. Three to five shaft sections represent a good compromise between the stability requirements in the working configuration and the desired compactness in the transport configuration. In practice, with respect to the stability, it is especially preferred to configure the outboard drive with shaft sections that are provided with guide bolts which fit respective openings at the adjacent shaft section and to fix the shaft sections by a pullrope.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic representation of an electrically powered outboard drive for a boat;

FIG. 2 is an enlarged representation of detail A in FIG. 1;

FIG. 3 is an alternative representation of detail A in FIG. 1;

FIG. 4 is another embodiment of detail A;

FIG. 5 is yet another embodiment of detail A;

FIG. 6 is a top view of an inventive outboard drive in the transport configuration;

DETAILED DESCRIPTION OF THE DRAWINGS

Figure 7:
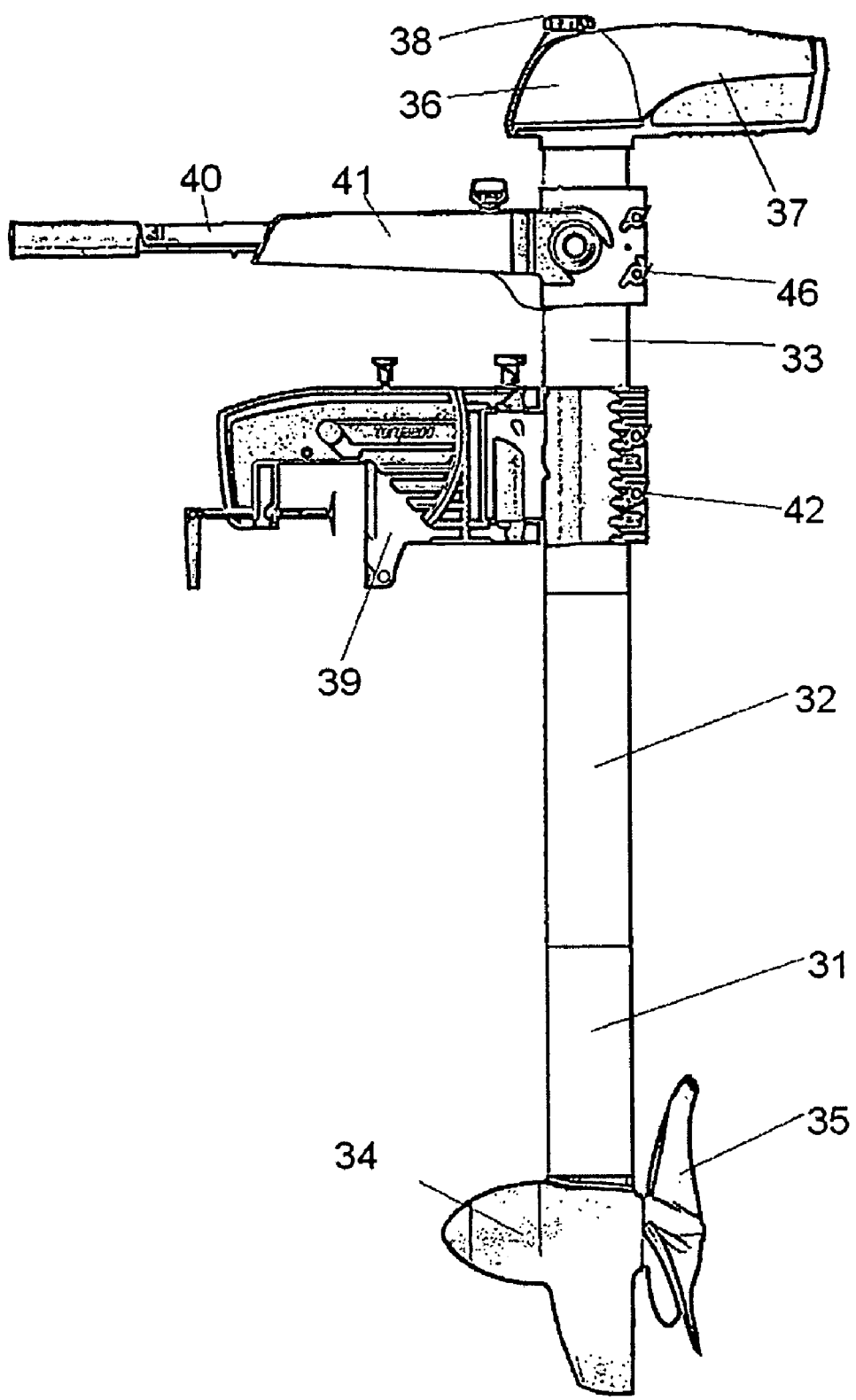
FIG. 7 is an elevational view of another embodiment of the outboard drive of the present invention in the working configuration.

FIG. 1 shows an electrically powered outboard drive essentially comprising a head 1, a pylon 2 which is provided with a propeller 3, and a shaft 4 connecting the head 1 with the pylon 2. The head 1 covers a battery 5 used as power supply. An electric motor 6, located in the pylon 2, rotates the propeller 3 by a drive shaft (not shown). A gearing or transmission 7 may be used to reduce the number of revolutions of the electric motor 6. The electric motor 6 is connected to the battery 5 by an electric conducting cable 8 which is located inside the shaft 4. In order to conduct high currents during operation of the electric motor 6, an electric cable 8 is used having a cross section of at least 10 mm$^2$, preferably of at least 25 mm$^2$.

For transport, the inventive outboard drive can be reduced to a small and compact size. Therefore, the shaft 4 can be separated into three shaft sections 4a, 4b, 4c. In the working configuration of the outboard drive, the shaft sections 4a, 4b, 4c are rigidly fixed together.

FIGS. 2 to 5 show different preferred embodiments of the connection between the shaft sections 4a, 4b, 4c.

According to FIG. 2, the shaft sections 4a, 4b, 4c are screwed to each other. Shaft section 4a is a tube which is provided with an inside thread 9 at one end and an outside thread 10 at the other end. Shaft sections 4b and 4c are construed in the same way.

In the working configuration, that is when the outboard drive is ready for operation, all parts 1, 4a, b, 4c, 2 are screwed to each other. The screw connections 9, 11 of shaft sections 4a, 4b make it possible to variably change the length of the shaft. All screw connections 9, 10, 11, 12 are easy to handle and guarantee a safe and rigid connection of the head 1 to shaft section 4a, of shaft sections 4a, 4b, 4c to each other and of shaft section 4c to the pylon 2. The electric cable 8 runs inside the shaft sections 4a, 4b, 4c.

For transport, all screw connections 9, 10, 11, 12 are loosened. In the transport configuration, the shaft sections 4a, 4b, 4c are freely movable along the cable 8. Cable 8, together with the shaft sections 4a, 4b, 4c, is rolled around the head 1, as schematically shown in FIG. 6. The pylon 2 and the propeller 3 are placed onto the head 1. The propeller 3 may be separated from the pylon 2 as shown in FIG. 6. But it is also possible to leave the propeller 3, together with the pylon 2, as one unit. The outboard drive can then be packed into a backpack or another bag.

FIGS. 3 to 5 show alternative embodiments to connect two shaft sections 4a, 4b. For reasons of clearness, only two shaft sections 4a, 4b are shown. Of course, all described alternatives can be transferred to a shaft with more than two shaft sections.

According to FIG. 3, the upper tubular shaft section 4a is provided with a plastic inset 13 which comprises a central hole 14 and a conical end 15. The lower shaft section 4b is provided with a respective plastic counterpart 16. The connections of shaft section 4a, with the head 1, and of shaft section 4b, with pylon 2, are preferably construed in the same way and are also provided with interlocking plastic elements. Preferably, one of the shaft sections 4b is provided with guide bolts 22 which fit to respective openings at the other shaft section 4a.

For transportation, all parts 1, 4a, 4b, 2 can be pulled apart and separated and, for example, be packed analogous to FIG. 6.

In operation, i.e., in the working configuration, all parts 1, 4a, 4b, 2 are plugged together. A pull rope 17 is fixed to the pylon 2 and extends together with the cable 8 inside the hollow shaft sections 4a, 4b. The upper part 1 is provided with clamping apparatus 18 which can be used to fix and secure the pull rope. By pulling and tightening the pull rope 17 all parts 1, 4a, 4b, 2 can be fixed together.

FIG. 4 shows another alternative for connecting the shaft sections. Both shaft sections 4a, 4b are arranged parallel but offset with respect to their longitudinal axis. connectors 19, 20 hold both shaft sections 4a, 4b together. The electric cable 8 extends inside the tubular shaft sections 4a, 4b. Close to their connection point, both shaft sections 4a, 4b are provided with slots (not shown). The cable 8 is passed through the slots from one shaft section 4a to the other shaft section 4b.

Finally, FIG. 5 shows yet another embodiment wherein both shaft sections 4a, 4b are plugged one into another and secured by a secure bolt 21.

Figure 8:
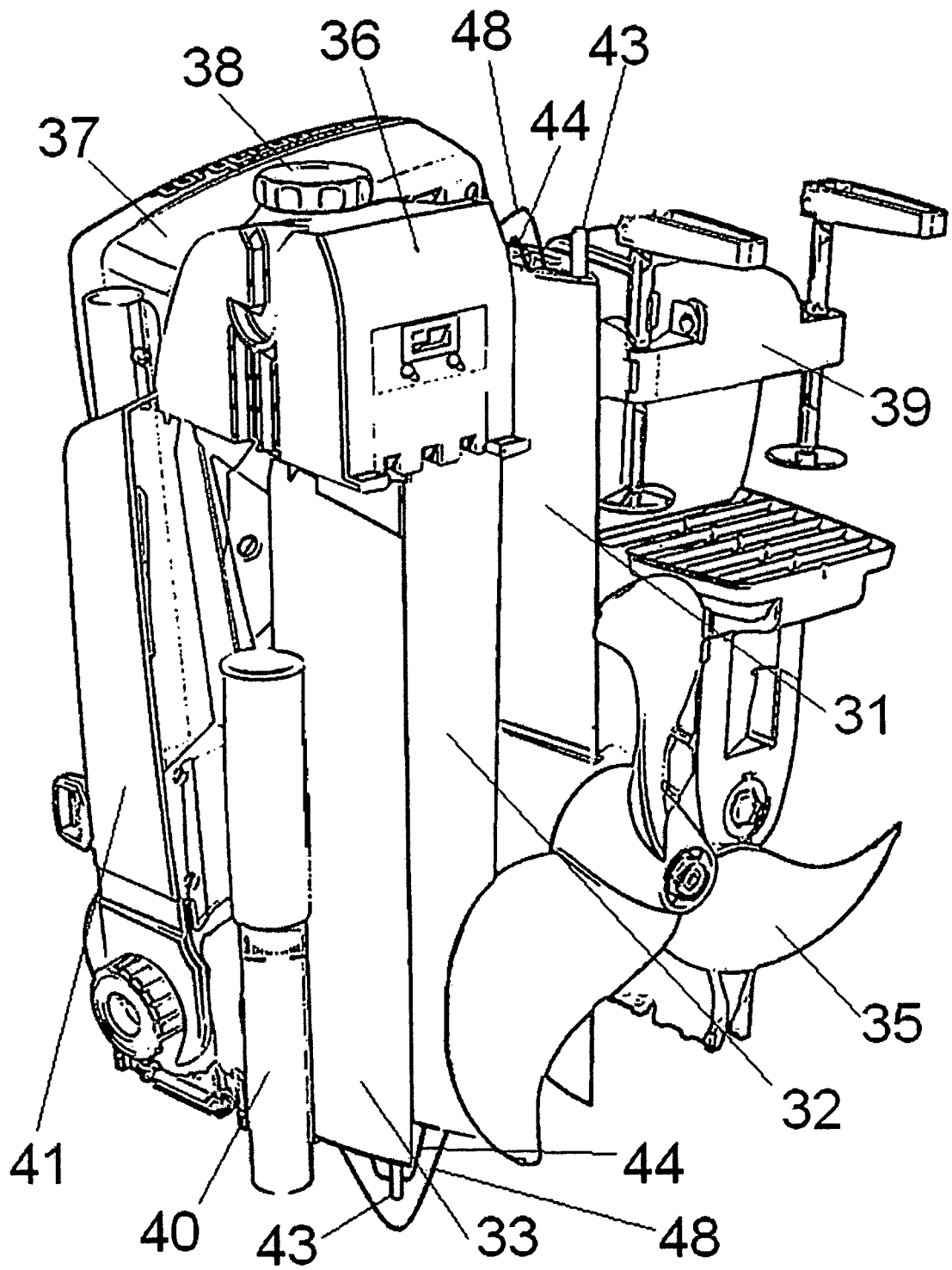
FIG. 8 is a perspective view of the drive shown in FIG. 7 in the transport configuration.

FIGS. 7 and 8 show a preferred embodiment of the inventive outboard drive in the working configuration as well as in the transport configuration.

The outboard drive comprises a shaft which can be separated into three shaft sections 31, 32, 33. The lower shaft section 31 is rigidly connected to the pylon 34. An electrically powered motor is located in the pylon 34 driving the propeller 35. The upper shaft section 33 is coupled to head 36 provided with mounting apparatus for the battery 37.

A cable 44 extends inside the shaft sections 31, 32, 33, extends from the electric motor, in the pylon 2, to the battery connectors at the mounting apparatus 36 which comprises contacts that are automatically connected to the cable 44 when the battery 37 is mounted to the head 36. Thus, the electric motor is automatically connected to the power supply 37.

Further, a pull rope 48 extends through the interior of shaft 31, 32, 33. Pull rope 48 is fixed to the lowermost shaft section 31, extends through shaft sections 32, 33 and can be tightened by a turning knob 38 so that the shaft sections 31, 32, 33 are rigidly fixed together. In a direction transverse to the longitudinal axis of the shaft sections 31, 32, 33, the shaft sections 31, 32, 33 are supported by bolts 43 (see FIG. 8) which fit into respective holes of the adjacent shaft section 32, 33.

The outboard drive further comprises a mounting device 39 for mounting the outboard drive to the stern of a boat and a steering means or tiller made of two sections 40, 41. A control wire (not shown) establishes the electrical connection between the tiller 40, 41 and the electric motor. The control wire also extends inside the shaft sections 31, 32, 33, and leaves the shaft section 33 near the tiller 40, 41. Control wire can be plugged into a respective socket at the tiller 41.

FIG. 8 shows the outboard drive according to FIG. 7 in its transport configuration. For transport, the outboard drive can be packed and stowed to a compact size and can be carried in a backpack.

In order to demount the outboard drive, the tiller 40, 41 is removed from shaft section 33 by loosening screw coupling 46. Tiller 40, 41 is removed from the shaft and separated in its two parts 40 and 41. Mounting device 39 is also removed from shaft section 33 by opening screws 42. Battery 37 is hooked in the mounting apparatus 36 during operation of the outboard drive. Battery 37 can be folded up and removed from the mounting apparatus 36 during transport.

Shaft sections 31, 32, 33 are separated from each other by loosening turning knob 38. Thereby, pull rope 48 is released. Turning knob 38 is opened to such a degree that shaft sections 31, 32, 33 can be pulled apart. FIG. 8 further shows bolts 43 which interlock with respective holes after shaft sections 31, 32, 33 have been plugged together.

After release of pull rope 48, the shaft sections 31, 32, 33 can be freely moved with respect to each other. They are only connected by cable 44 and pull rope 48 which run inside the shaft sections 31, 32, 33. In the transport configuration, shaft sections 31, 32, 33 can be arranged side by side. FIG. 8 shows a preferred arrangement of the individual parts of the outboard drive. At the leftmost position are both parts 40, 41 of the tiller, next there are shaft sections 31, 32, 33 and the mounting device 39. In FIG. 8 the battery 37 is located behind the other parts 40, 41, 31, 32, 33.

What is claimed is:

1. Transportable boat outboard drive for a boat, comprising a head, a pylon, a shaft operatively connecting the head and the pylon, an electric motor and a cable inside said shaft and extending from an interior of the head to the pylon, wherein said shaft comprises at least two shaft sections, and said head, said shaft and said pylon are arrangeable in a working configuration and in a transport configuration such that, in the working configuration, said head, said shaft and said pylon are rigidly connected to each other and in said transport configuration each of the shaft sections of said shaft are separable so as to be positionable independently with respect to each other without requiring separation of said cable running throughout the shaft sections.

2. Outboard drive according to claim 1, wherein, in said transport configuration, at least a part of said cable is freely movable with respect to at least one of said shaft section.

3. Outboard drive according to claim 1, wherein, in said transport configuration, said shaft or at least one of said shaft sections is in a direction of an axis of said shaft freely movable with respect to said cable.

4. Outboard drive according to claim 1, wherein, in said transport configuration, all shafts sections are freely movable with respect to said cable.

5. Outboard drive according to claim 1, wherein, in said working configuration, said shaft sections are operatively plugged together.

6. Outboard drive according to claim 1, wherein a pull rope is arranged inside said shaft or inside said shaft sections.

7. Outboard drive according to claim 1, wherein, during a change between said working configuration and said transport configuration, one of said shaft sections is arranged to slide into another shaft section.

8. Outboard drive according to claim 1, wherein, in said transport configuration, said cable together with said shaft sections winds around said head.

* * * * *